(12) United States Patent
Ali

(10) Patent No.: US 8,869,789 B2
(45) Date of Patent: Oct. 28, 2014

(54) FOOD SERVING ASSEMBLY

(76) Inventor: Fahemah A. Ali, Hateen Area (KW)

(*) Notice: Subject to any disclaimer, the term of this patent is extended or adjusted under 35 U.S.C. 154(b) by 347 days.

(21) Appl. No.: 13/073,284

(22) Filed: Mar. 28, 2011

(65) Prior Publication Data

US 2012/0247449 A1 Oct. 4, 2012

(51) Int. Cl.
*A47G 23/04* (2006.01)
*A47J 36/24* (2006.01)

(52) U.S. Cl.
CPC .......... *A47J 36/2494* (2013.01); *A47J 36/2477* (2013.01)
USPC ......................................................... 126/261

(58) Field of Classification Search
USPC ........... 99/339, 340, 341, 400, 401, 446, 447, 99/448, 449, 450, 483; 126/9 R, 9 A, 9 B, 126/37 R, 25 A, 25 R, 39 B, 39 E, 40, 43, 45, 126/261, 377.1; 220/FOR. 140, 694; 219/214, 217; 426/113, 407, 523; 431/298, 320, 325
See application file for complete search history.

(56) References Cited

U.S. PATENT DOCUMENTS

| | | | | |
|---|---|---|---|---|
| 2,211,314 A | * | 8/1940 | Beggs | 248/188.5 |
| 3,064,637 A | * | 11/1962 | Thomson | 126/9 R |
| 3,452,736 A | * | 7/1969 | Gunter et al. | 126/25 R |
| 4,838,446 A | | 6/1989 | Ali | |
| 4,860,906 A | * | 8/1989 | Pellegrini et al. | 215/12.2 |
| 4,920,873 A | | 5/1990 | Stevens | |
| 5,282,593 A | * | 2/1994 | Fast | 248/188.4 |
| 5,287,800 A | | 2/1994 | Orednick | |
| 5,467,697 A | | 11/1995 | Hunziker | |
| 5,595,108 A | * | 1/1997 | Sheu | 99/425 |
| 5,819,640 A | | 10/1998 | Cuomo et al. | |
| 5,832,915 A | * | 11/1998 | Skidmore et al. | 126/9 R |
| 5,881,637 A | | 3/1999 | Strickel | |
| 2005/0150395 A1 | * | 7/2005 | Olekaibe et al. | 99/483 |

FOREIGN PATENT DOCUMENTS

| EP | 1648235 | * | 4/2006 |
|---|---|---|---|
| EP | 1955627 | * | 8/2008 |

* cited by examiner

*Primary Examiner* — Dana Ross
*Assistant Examiner* — Joseph Iskra
(74) *Attorney, Agent, or Firm* — Lowe Hauptman & Ham, LLP

(57) ABSTRACT

A heatable food serving assembly includes a stainless steel frame, an upper frame member fixed to the frame, a removable lower frame member, an intermediate frame member removeably fastened to the frame. A food container support member is supported on the upper frame member and includes a thin serpentine shaped aluminum heat transfer element for contacting the bottom of a food container and for transferring heat from one or two candles to the bottom of the food container or food containers. The food serving assembly also includes four foldable or pivotable legs and a height adjusting mechanism on three of the legs. A leveling device is also included in order to facilitate obtaining a horizontal disclosed stable platform for serving food.

1 Claim, 3 Drawing Sheets

FOOD SERVING ASSEMBLY

FIELD OF THE INVENTION

This invention relates to a food serving assembly and more particularly to a heatable food serving assembly for displaying and serving hot food in a buffet setting.

BACKGROUND FOR THE INVENTION

Chafing dishes are well known and in widespread use by restaurants and other food services. Such dishes typically include a frame that contains a burner. The chafing dish or tray is filled with water and supported by a rack above a burner. Trays are then placed into the chafing dish tray to be heated by the warmed water and maintained hot by the burner. Chafing dishes are and have been in widespread use and developments of improved chafing dishes are well documented.

For example, a U.S. patent of Stevens, U.S. Pat. No. 4,920,873 discloses a stackable chafing assembly that includes a stack of chafer units in which a first lowermost unit has a frame which supports a water pan and the other units rest within the pan in compact fashion. The frame is designed to support one or more chafer units above it with the frame of each successively higher unit resting on the frame of the next lower unit to thereby provide a compact stacked assembly.

A more recent approach to a display system for food containers is disclosed in the U.S. patent of Orednick, U.S. Pat. No. 5,287,800. As disclosed therein, a disposable system provides caterers, campers and picnickers with an ability to transport serve and display food. The system includes a plurality of bent wires and plastic legs that are provided in a kit form which may be assembled into a knock-down stand for supporting disposable utensils. The bent wires also support a suitable burner.

A further approach to a disposable chafing dish is disposed in a patent of Hunziker, U.S. Pat. No. 5,467,697. The Hunziker chafing dish assembly includes a pair of rings that support a pair of heating elements located below a water tray. The water tray is elevated above the heating elements by a frame supported by a pair of pivoting legs. Located within the water tray is a pair of food dishes. The heating elements heat the water within the tray, which heats the food within the dishes. The frame has a bent top edge which provides a ledge for the water tray. The rings are cantilevered from the frame so that the weight of the heating elements deflects the rings away from the water tray. The height of the frame and the weight of the heating elements decrease as the fuel within the elements become expended. The reduction in the weight of the heating element induces an upward movement of the rings toward the water tray, wherein the smaller flame is moved into closer proximity with the tray to provide a more uniform heating process of the food.

Still further, a U.S. Pat. No. 5,819,640 of Cuomo et al. discloses a chafer structure and assembly for use in food service. As disclosed in the patent, a fire retardant, portable chafer structure includes four sides and a bottom defining a generally rectangular-shaped structure having an interior chamber therewithin. The bottom is connected along a lower edge of each of the four sides to define a bottom tray adapted for holding and containing spilled material. A chafer rack is provided for placement in nested engagement within the chafer structure. One of the four sides has an aperture of providing access to the interior chamber by a user. Handles are provided on upper portions of the chafer structure, Notwithstanding the above, it is presently believed that there is a need and a potential commercial market for a waterless food service assembly according to the present invention. There should be a demand for such assemblies because they eliminate the need for hot or cold water, the need to transport or empty large pans of hot water and therefore reduce the risk of burns. Further, the food service assemblies in accordance with the present invention are relatively easy to transport and store in a compact space. In addition, the food service assembly disclosed hereafter are of a rugged design, long lasting and are easy to set up, operate and clean and can be manufactured and sold at a competitive price. Further, the assemblies in accordance with one embodiment of the invention include a height adjustment mechanism providing a more secure platform in the event of unevenness in the floor or on the ground when using the device outdoors.

BRIEF SUMMARY OF THE INVENTION

In essence, a heatable food serving assembly for displaying and serving hot food in a buffet setting includes a stainless steel frame having an upper frame member, a removable lower frame member and a removable intermediate frame member between the upper frame member and the lower frame member. A generally rectangular stainless steel food container having a bottom and four upwardly extending side walls surrounding the bottom contains a supply of food and the upper frame member supports the food container. Further, four foldable and pivotable legs support the upper frame and the food container at a convenient height for serving food and are foldable into a folded position for storage and transport. A food container support member is disposed on the upper frame member for supporting the food container while a candle support member is disposed on the intermediate frame member for positioning a candle under the container support member. Further, the container support member includes a thin aluminum heat transfer element for contacting the bottom of the food container and for transferring heat from a candle to the bottom of the food container. A lower storage member is disposed on the lower frame member for holding supplies. In addition, a shatter-proof glass cover includes a generally rectangular shaped stainless steel ring around its outer periphery and an insulated handle for removing the cover.

The invention will now be described in accordance with the following figures wherein like numbers have been used to illustrate like parts.

DESCRIPTION OF THE DRAWINGS

FIG. 3 is a top or plan view of the food serving assembly shown in FIG. 1 and including a level indicating device.

DETAILED DESCRIPTION OF THE INVENTION

Figure 1:
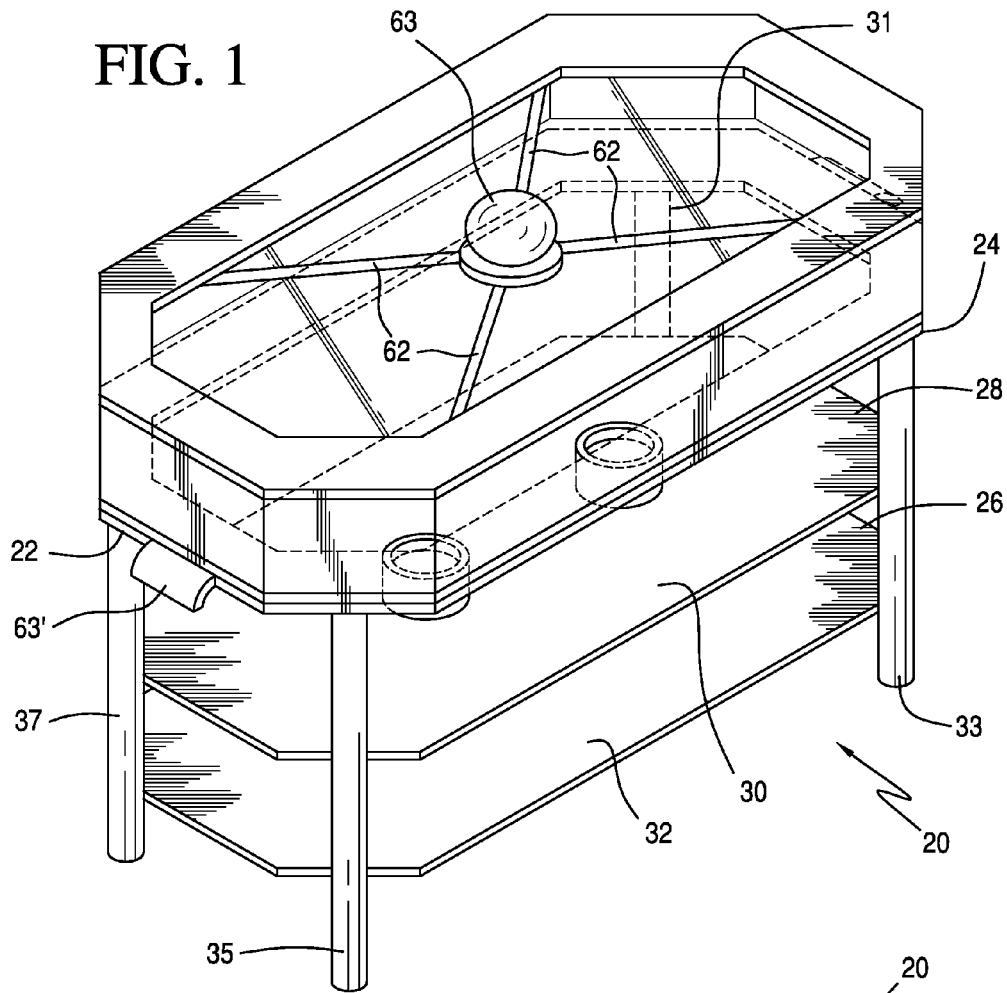
FIG. 1 a schematic perspective view of a food service assembly in accordance with a first embodiment of the invention.
Figure 2:
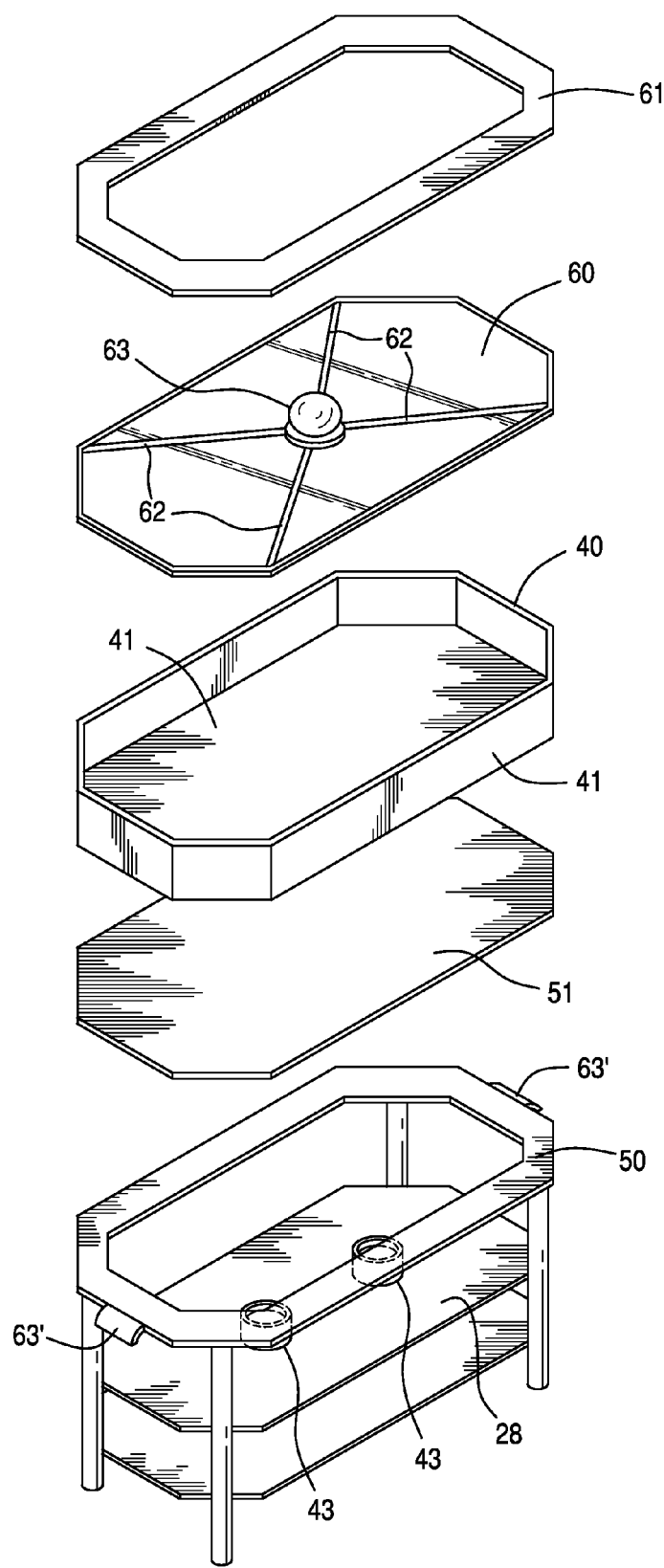
FIG. 2 is a schematic illustration of the food serving assembly shown in FIG. 1 and including it's various parts.

FIGS. 1-3 illustrate a heatable food display and serving assembly 20 for serving hot food in a buffet setting. The food serving assembly 20 includes an extended or stretched out octagonal stainless steel frame 22 having a fixed upper frame member 24, a removable lower frame member 26 and a removable intermediate frame member 28 between the upper frame member 24 and lower removable frame member 26.

The removable frame members 26 and 28 each support a octagonal tray 30 and 32 respectively that may be integral with the frame member. For example, the outer periphery of the trays 30 and 32 may constitute the frame as they extend between the four legs 31, 33, and 37. The legs 31, 33, 35 and 37 are permanently affixed to the upper frame 24 or bolted thereto and not readily removable therefrom. The legs 31, 33, 35 and 37 are also foldable into a folded position for transporting and storage in an upright position with diagonal braces (not shown) positioning the legs.

An octagonal shaped food container 40 has a bottom 41 and upwardly extending sidewalls 41 for containing a supply of food. The food container 40 may be generally rectangular in shape or extended octagonal shape to present a more pleasing appearance. The food container 40 is supported in the top of the upper frame member 26. In addition a container support member 50 is supported and/or fixed to the upper frame for receiving the food container 40 thereon. The food support member 50 also includes a thin preferably serpentine shaped aluminum heat transfer element 51. The member 50 comes into contact with the bottom 41 of the food container 40.

The heat transfer element conducts heat from one or two candles 43 that are positioned below the food container 40 on a tray supported by the intermediate frame member 28. The use of the serpentine shaped element is to provide heat or energy across the bottom 41 of the food container 40.

The assembly 20 also includes a shatter proof glass cover 60 having a stainless steel ring 61 about its periphery and a series of radially extending strips 62 for providing a pleasing appearance and a strengthen structure. The cover 60 also includes an insulated handle 63 in the center of the cover 60 for removing the cover 60 for serving food. In a preferred embodiment of the invention the cover 60 has the shape of an elongated octagon. A pair of handgrips 63' is provided on the upper frame member for assistance in moving the food serving assembly 20 from one location to another.

Figure 4:
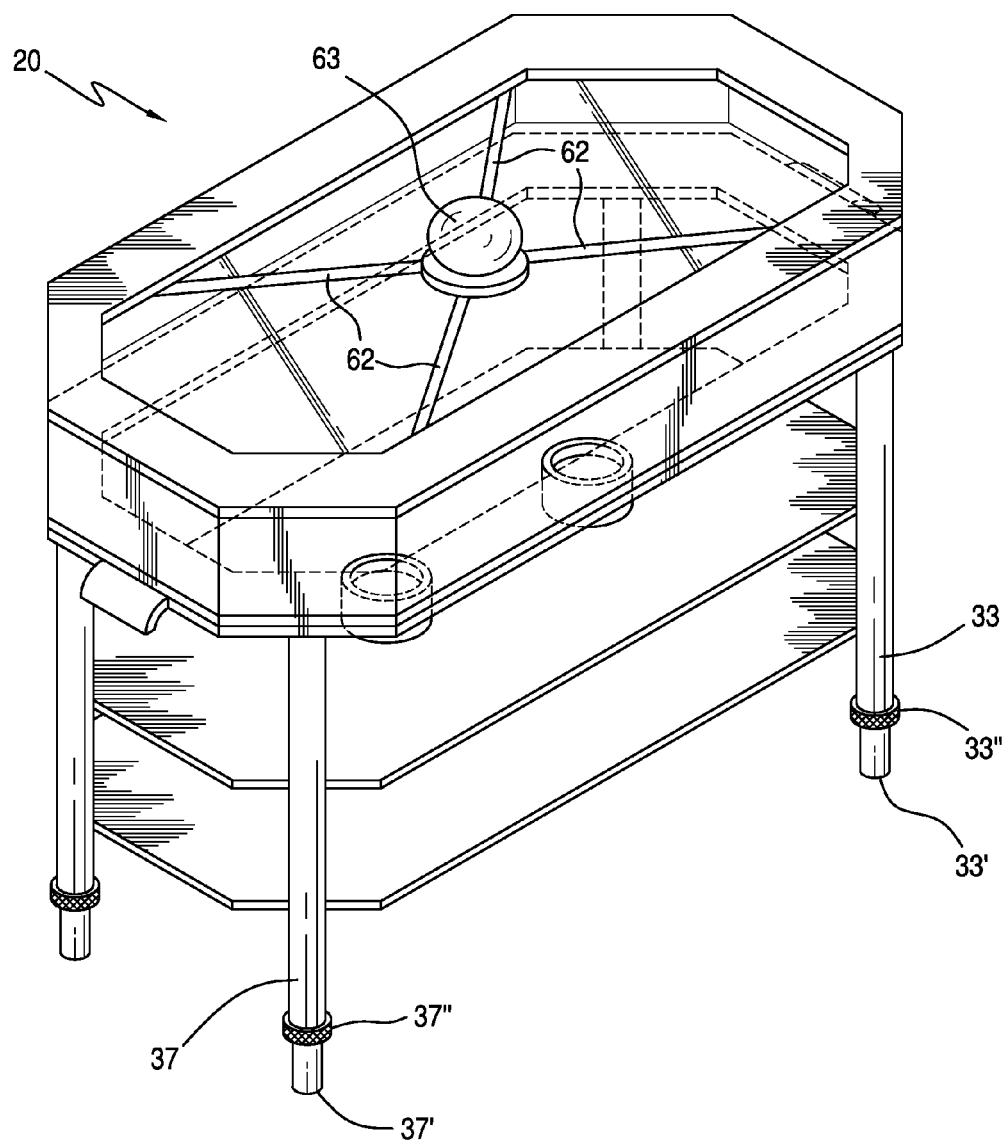
FIG. 4 a view of the telescoping legs and clamp for adjusting the height of the upper frame member for use in accordance with a preferred embodiment of the invention.

As shown in FIG. 4 a pair of adjustable legs 33 and 37 each of which include a telescoping assembly 33' and 37' and clamping members 33"and 37" provide adjustment for any unevenness in the ground. As shown in FIG. 3, a pair of leveling indicators 65 are useful in setting up the assembly in a level position.

While the invention has been described in connection with the accompanying drawings it should be recognized that changes and modifications may be made therein without departing from the scope of the appended claims.

What is claimed is:

1. A heatable food serving assembly for displaying and serving hot food in a buffet setting, said heatable food service assembly consisting of:

a stainless steel frame having an extended octagonal shape including a fixed upper frame member, a removable lower frame member and a removable intermediate frame member between said upper frame member and said lower frame member;

an extended octagonal stainless steel food container having a bottom and eight upwardly extending side walls surrounding said bottom for containing a supply of food and said upper frame member supporting said food container;

four foldable and pivotable legs for supporting said upper frame and said food container at a convenient height for serving food and foldable into a folded portion for storage and transporting;

a food container support member disposed on said upper frame member for supporting said food container and a pair of handgrips disposed on said fixed upper frame member for assistance in moving the food serving assembly;

a candle support member disposed on said intermediate frame member for positioning a candle under said container support member and said container support member including a thin serpentine shaped aluminum heat transfer element for contacting said bottom of said food container and for transferring heat from a candle to said bottom of said food container;

a lower storage member disposed on said lower flame for holding supplies, and a shatter proof glass cover further consisting of a stainless steel ring around its outer periphery and a series of radially extending strips providing a strengthened structure, and an insulated handle in the center of said cover for removing said cover;

height adjusting means consisting of a telescoping assembly and clamping member on three of said legs for providing a stable platform for serving food; and which includes a plurality of telescoping legs with clamps for adjusting the height of each of the plurality of legs.

* * * * *